B. B. Williams,
Harrow.
No. 88,931. Patented Apr. 13, 1869.
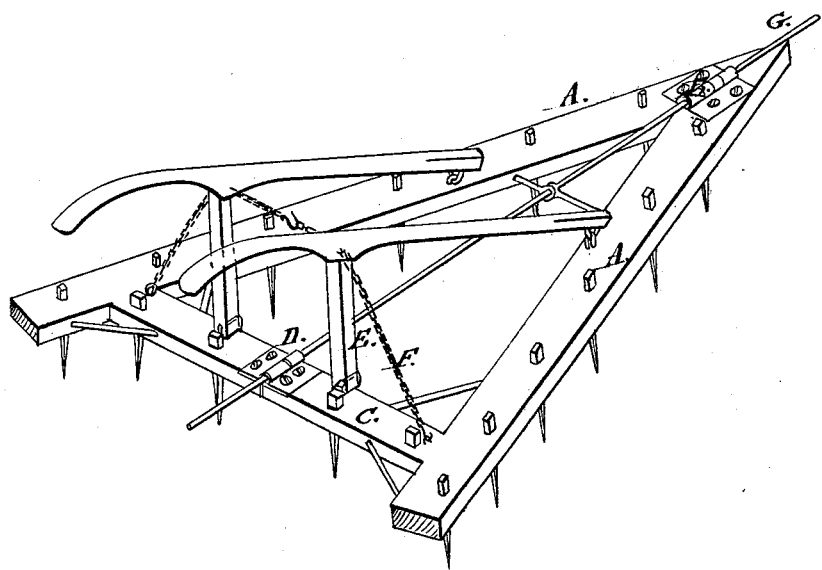
Witnesses:
John F. Brooks
E. Greene Cline
Inventor:
B. B. Williams
per Munn & Co.
Attorneys.

B. B. WILLIAMS, OF LACLEDE, MISSOURI.

Letters Patent No. 88,931, dated April 13, 1869.

IMPROVEMENT IN HARROWS.

The Schedule referred to in these Letters Patent and making part of the same.

*To all whom it may concern:*

Be it known that I, B. B. WILLIAMS, of Laclede, in the county of Linn, and State of Missouri, have invented a new and useful Improvement in Harrows; and I do hereby declare that the following is a full, clear, and exact description thereof, which will enable others skilled in the art to make and use the same, reference being had to the accompanying drawing, forming part of this specification.

This invention is designed to arrange harrows so that they may be readily folded into such shape, that they may be drawn over the ground, when it is required to remove them from one place of operation to another without the teeth being in contact with the ground.

The drawing represents a perspective view of my improved harrow.

The side-pieces A of the framing are joined together at the front by a hinge, and the cross-piece C is also jointed and hinged at the centre D, whereby one part of the harrow may be folded over on the other.

The handles are hinged at their connection with the side-pieces, and the posts E of the handles are hinged so that they may fold down in an outward direction When in operation, the handles are maintained in position by the chain F, which unhooks in the centre, for the purpose of allowing the said handles to fold down.

When the harrow is to be folded, for moving over the ground which it is not designed to harrow, the handles are folded as above described, and one part of the harrow folded over on the other.

The whole is then turned again, which will bring the outer edges of the side-pieces A on the ground, with the central portion of the harrow upward, in which position it will run smoothly over the ground, being drawn by the rod G, which is arranged for hitching to by a swivel-joint.

Having thus described my invention,

I claim as new, and desire to secure by Letters Patent—

The harrow herein described, consisting of the hinged parts A and C, in combination with the rod G, hinged standards E, and chain F, substantially as and for the purpose set forth.

B. B. WILLIAMS.

Witnesses:
 JOHN L. REYNOLDS,
 GEO. W. SLOAN.